US010185585B2

(12) United States Patent
Atanasov

(10) Patent No.: US 10,185,585 B2
(45) Date of Patent: Jan. 22, 2019

(54) CALCULATING A PERFORMANCE METRIC OF A CLUSTER IN A VIRTUALIZATION INFRASTRUCTURE

(71) Applicant: VMware, Inc., Palo Alto, CA (US)

(72) Inventor: Rusko Atanasov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 14/642,517

(22) Filed: Mar. 9, 2015

(65) Prior Publication Data

US 2016/0266920 A1 Sep. 15, 2016

(51) Int. Cl.
G06F 9/455 (2018.01)
G06F 17/30 (2006.01)
G06F 11/34 (2006.01)
G06F 11/30 (2006.01)

(52) U.S. Cl.
CPC ........ *G06F 9/45558* (2013.01); *G06F 11/301* (2013.01); *G06F 11/3409* (2013.01); *G06F 17/30424* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,509,711 B1 * | 11/2016 | Keanini | G06F 21/6254 |
| 2013/0247043 A1 * | 9/2013 | Bingham | G06F 9/45533 718/1 |
| 2016/0147550 A1 * | 5/2016 | McWilliams | G06F 21/121 718/1 |

* cited by examiner

*Primary Examiner* — Tammy E Lee

(57) ABSTRACT

In a computer-implemented method for calculating a performance metric of a cluster of hosts in a virtualization infrastructure a performance metric of each of a plurality of virtual machines in said virtualization infrastructure is accessing by a centralized management application of a virtualization infrastructure. The virtualization infrastructure comprises a plurality of hosts supporting the plurality of virtual machines. A performance metric of a cluster of the plurality of hosts is calculated by the centralized management application based on the performance metric of each of the plurality of virtual machines hosted by the cluster. The calculated performance metric of the cluster is transmitted to a database such that a history of performance metrics of the cluster are stored in the database.

18 Claims, 5 Drawing Sheets

400

```
ACCESS, BY A CENTRALIZED MANAGEMENT APPLICATION OF A
VIRTUALIZATION INFRASTRUCTURE, A PERFORMANCE METRIC OF EACH
OF A PLURALITY OF VIRTUAL MACHINES IN THE VIRTUALIZATION
INFRASTRUCTURE, WHEREIN THE VIRTUALIZATION INFRASTRUCTURE
COMPRISES A PLURALITY OF HOSTS SUPPORTING THE PLURALITY OF
VIRTUAL MACHINES
410
```

```
PERIODICALLY ACCESS DURING A TIME INTERVAL A PERFORMANCE
METRIC OF EACH OF A PLURALITY OF VIRTUAL MACHINES
412
```

```
CALCULATE, BY THE CENTRALIZED MANAGEMENT APPLICATION, A
PERFORMANCE METRIC OF A CLUSTER OF THE PLURALITY OF HOSTS,
BASED ON THE PERFORMANCE METRIC OF EACH OF THE PLURALITY OF
VIRTUAL MACHINES HOSTED BY THE CLUSTER
420
```

```
TRANSMIT THE CALCULATED PERFORMANCE METRIC OF THE CLUSTER TO A
DATABASE, SUCH THAT A HISTORY OF PERFORMANCE METRICS OF THE
CLUSTER ARE STORED IN THE DATABASE
430
```

```
DISCARD A PERFORMANCE METRIC OF ONE THE PLURALITY OF VIRTUAL
MACHINES IF THE PERFORMANCE METRIC IS RECEIVED DURING A
SUBSEQUENT TIME INTERVAL
440
```

```
RESET AN ACCUMULATOR FOR CALCULATING THE PERFORMANCE METRIC
OF THE CLUSTER AT AN END OF A PERIODIC TIME INTERVAL
450
```

```
QUERY THE DATABASE FOR THE HISTORY THE PERFORMANCE METRICS OF
THE CLUSTER SUCH THAT THE DATABASE IS NOT QUERIED FOR THE
PERFORMANCE METRIC OF EACH OF A PLURALITY OF VIRTUAL MACHINES
HOSTED BY THE CLUSTER
460
```

ACCESS, BY A CENTRALIZED MANAGEMENT APPLICATION OF A VIRTUALIZATION INFRASTRUCTURE, A CENTRAL PROCESSING UNIT (CPU) PERFORMANCE METRIC OF EACH OF A PLURALITY OF VIRTUAL MACHINES IN THE VIRTUALIZATION INFRASTRUCTURE, WHEREIN THE VIRTUALIZATION INFRASTRUCTURE COMPRISES A PLURALITY OF HOSTS SUPPORTING THE PLURALITY OF VIRTUAL MACHINES
510

PERIODICALLY ACCESS DURING A TIME INTERVAL A CPU PERFORMANCE METRIC OF EACH OF A PLURALITY OF VIRTUAL MACHINES
512

CALCULATE, BY THE CENTRALIZED MANAGEMENT APPLICATION, A CPU PERFORMANCE METRIC OF A CLUSTER OF THE PLURALITY OF HOSTS BY AGGREGATING THE CPU PERFORMANCE METRIC OF EACH OF THE PLURALITY OF VIRTUAL MACHINES HOSTED BY THE CLUSTER
520

TRANSMIT THE CALCULATED CPU PERFORMANCE METRIC OF THE CLUSTER TO A DATABASE, BY THE CENTRALIZED MANAGEMENT APPLICATION, SUCH THAT A HISTORY OF CPU PERFORMANCE METRICS OF THE CLUSTER ARE STORED IN THE DATABASE
530

DISCARD A CPU PERFORMANCE METRIC OF ONE THE PLURALITY OF VIRTUAL MACHINES IF THE CPU PERFORMANCE METRIC IS RECEIVED DURING A SUBSEQUENT TIME INTERVAL
540

QUERY THE DATABASE FOR THE HISTORY THE CPU PERFORMANCE METRICS OF THE CLUSTER FOR IMMEDIATE DISPLAY OF THE HISTORY THE CPU PERFORMANCE METRICS OF THE CLUSTER
550

QUERY THE DATABASE FOR THE HISTORY THE CPU PERFORMANCE METRICS OF THE CLUSTER SUCH THAT THE DATABASE IS NOT QUERIED FOR THE CPU PERFORMANCE METRIC OF EACH OF A PLURALITY OF VIRTUAL MACHINES HOSTED BY THE CLUSTER
560

FIG. 5

CALCULATING A PERFORMANCE METRIC OF A CLUSTER IN A VIRTUALIZATION INFRASTRUCTURE

BACKGROUND

In some instances, it may be difficult to access large of amounts of data stored in a database for immediate use. For example, a user may query a database for millions of records of data. As a result, the database is put under a heavy load and may be unable to provide the requested records in a timely manner. It may take the database minutes to process the query while the user requesting the data desires the data immediately.

Additionally, relational databases may not scale very well. Thus, they do not provide timely results to frequent queries to large amounts of stored data.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 4 depicts a flow diagram for a method for a performance metric of a cluster of hosts in a virtualization infrastructure, according to various embodiments.

FIG. 5 depicts a flow diagram for a method for a performance metric of a cluster of hosts in a virtualization infrastructure, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Virtual Computing Environment

Figure 1:
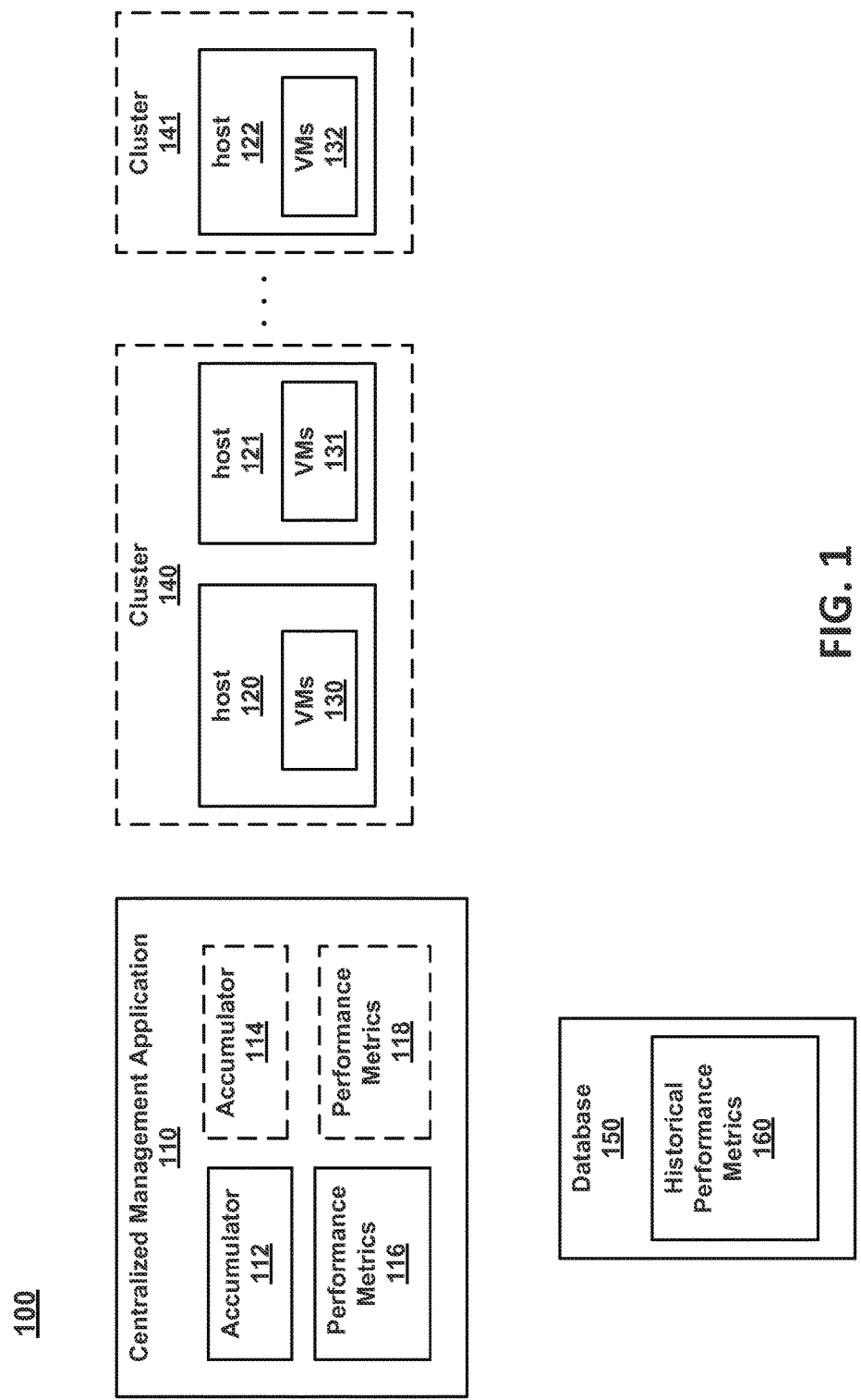
FIG. 1 depicts a block diagram of a virtual computing environment, according to various embodiments.

FIG. 1 depicts a block diagram that illustrates virtual computing environment (VCE) 100 (or virtualization infrastructure) that includes a plurality of physical hosts or servers (i.e., hosts 120, 121 and 122) that host various virtual machines. For example, host 120 hosts virtual machines 130, host 121 hosts virtual machines 131 and host 122 hosts virtual machines 132. In one embodiment, VCE 100 is a network wherein at least some of the components in VCE 100 are communicatively coupled with one another.

In one embodiment, VCE 100 is an enterprise system or network. The corporation or enterprise utilizes the combination of hardware and software to organize and run its operations. For example, an enterprise system may provide various computing resource for various needs such as, but not limited to information technology (IT), security, email, etc.

The physical hosts of VCE 100 each include physical hardware or resources (e.g., CPU, memory, storage) that are utilized by the virtual machines, which will be described in further detail below. It should be appreciated that VCE 100 can include any number of hosts that host any number of virtual machines. For example, VCE 100 includes 32 separate hosts that host thousands of virtual machines.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.). For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

It is understood that virtual machines implemented in VCE 100 are supported by one or some combination of physical computing machines. VCE 100 provides resources, such as storage, memory, servers, CPUs, network switches, etc., that are the underlying hardware infrastructure for VCE 100. Each virtual machine may include a guest operating system and a guest file system.

VCE 100 includes one or more clusters, such as cluster 140 and 141. In general, a cluster is a logical grouping of one or more hosts and the virtual machines/and resources of the one or more hosts. That is, a cluster is a collection of hosts (e.g., ESX Server hosts) and associated virtual machines with shared resources and a shared management interface. Moreover, when you add a host to a cluster, the host's resources become part of the cluster's resources. For example, cluster 140 is an aggregation of host 120 and host 121 and their respective resources and virtual machines. In particular, cluster 140 includes the virtual machines 130 supported by host 120 and virtual machines 131 supported by host 121. Moreover, cluster 140 includes the resources of host 120 (e.g., CPU, storage, and memory) of host 120, and the resources of host 121 (e.g., CPU, storage and memory).

Likewise, cluster 141 includes virtual machines 132 supported by host 122 and the resources (e.g., CPU, storage and memory) of host 122.

It should be appreciated that VCE 100 can include any number of clusters. For example, one cluster or more clusters. Additionally, a cluster can include any number one of hosts (e.g., one or more) and the hosts respective virtual machines and resources.

VCE 100 includes a centralized management application (CMA) 110 (e.g., vCenter Server). In general, CMA 110 is a centralized management tool for a suite of virtualization tools (e.g., vSphere suite) for VCE 100 for the vSphere suite. For example, CMA 110 allows for the management of multiple ESX servers and virtual machines from different ESX servers through a single console application. CMA 110 can be stored and executed on one the hosts (e.g., host 120, 121 or 122) or can be stored and executed on another physical device (e.g., client device) that is communicatively coupled with VCE 100.

CMA 110 enables a user (e.g., IT administrator) to manage VCE 100 from a single or centralized tool, via a user interface. In one scenario, a user may desire to determine the health of one or more clusters in VCE 100 via CMA 110. Accordingly, it may be desirable to determine the health or performance of various resources (e.g., CPU, memory, storage) in the VCE. For example, a user may determine if the various resources in a cluster are under or over utilized. In another example, a user may desire to determine performance metrics of a cluster in VCE 100 in order to efficiently manage the cluster.

In various embodiments, performance metrics of resources in a cluster are periodically calculated and subsequently transmitted to database 150. As a result, a history of stored pre-calculated performance metrics may be accessed from database 150 such that the history of performance metrics may be viewed to facilitate in managing VCE 100, which will be described in further detail below. Since the performance metrics of the clusters stored in the database are pre-calculated, it is not required to calculate the performance metrics at the time they are queried from the database to be viewed by a user.

Additionally, there is a very small additional database storage footprint by storing per-cluster performance metrics because there are significantly fewer clusters in VCE 100 as compared to the number of virtual machines in VCE 100.

Example Host Computer System

Figure 2:
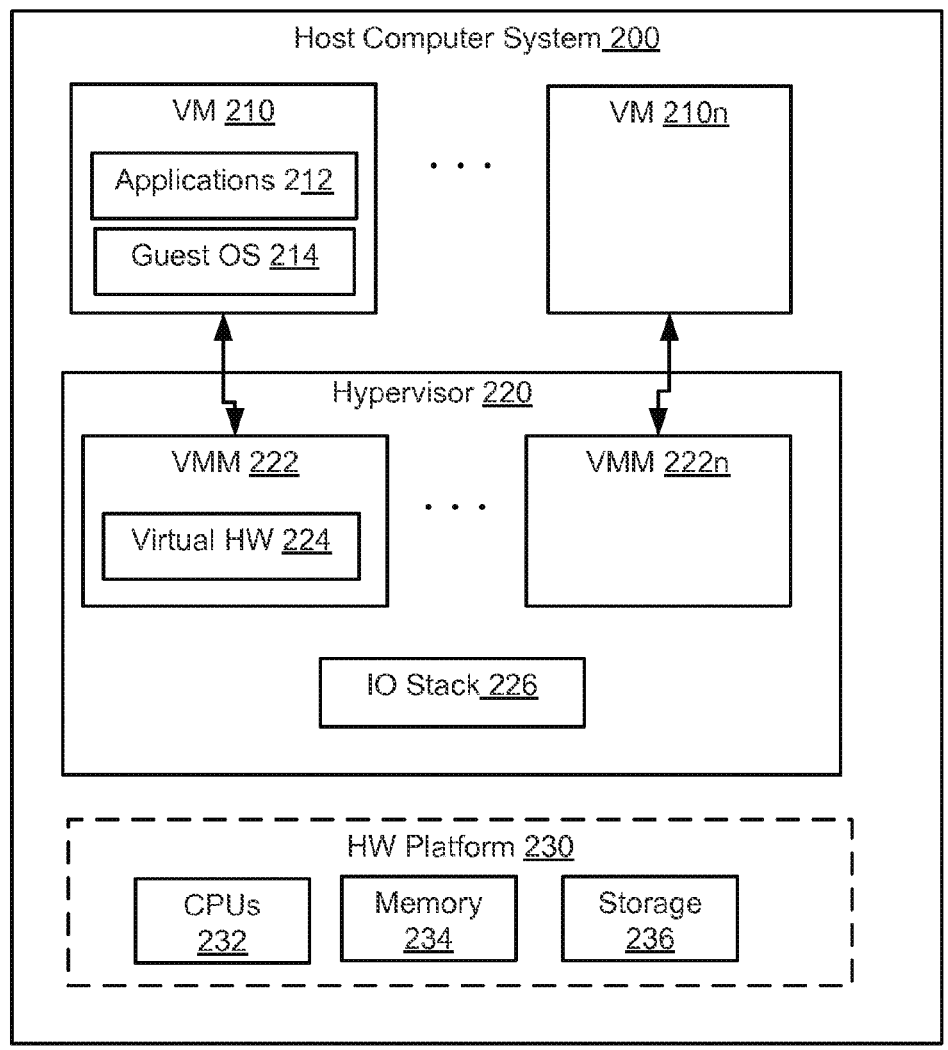
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222*n* may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Embodiments of Calculating Performance Metrics

Referring again to FIG. 1, various performance metrics of resources in VCE 100 may be accessed by CMA 110 and subsequently stored in database 150 such that a history of performance metrics may be accessed from database 150 and displayed to a user. The historical view of the performance metrics enables a user to view the health of VCE 100 based on performance of the underlying hardware.

CMA 110 is configured to access performance metrics of resources in VCE 100 and subsequently calculates performance metrics of various logical abstractions within VCE 100, such as performance metrics of datacenters, clusters and/or resource pools. It is noted that the logical abstractions are known by way of CMA 110. As such, the performance metrics of the logical abstractions are calculated/determined by CMA 110. That is, hosts of VCE 100 are not aware of, or are blind to, the logical abstractions. For example, although the resources of host 120 and host 121 are aggregated to create cluster 140, host 120 and host 121 are unaware that they are a part of cluster 140.

In one embodiment, CMA 110 may access performance metrics of various virtual machines in a cluster in order to determine a performance metric of the cluster. Initially, CMA 110 accesses performance metrics 116 that are the performance metrics of each individual virtual machine in cluster 140. In particular, each host in cluster 140 transmits a performance metric of each individual virtual machine supported by the host. For example, host 120 provides a performance metric for each of virtual machines 130 hosted by host 120. Likewise, host 121 provides a performance metric for each of virtual machines 131 hosted by host 121. As a result, CMA 110 receives performance metrics 116 of each individual virtual machine in cluster 140.

It should be appreciated that the hosts in VCE 100 may host thousands of individual virtual machines, wherein the hosts and respective virtual machines may be grouped into one or more clusters. Therefore, CMA 110 may receive thousands of performance metrics associated with the thousands of virtual machines. For example, if hosts 120 and 121 host 4000 virtual machines, then 4000 individual performance metrics are transmitted by hosts 120 and 121 to CMA 110.

In one embodiment, CMA 110 calculates a performance metric of a cluster based on the individual performance metrics of each virtual machine in the cluster. For example, accumulator 112 receives performance metrics 116, which are all the received performance metrics of virtual machines 130 and 131 in cluster 140. Accumulator 112 then calculates the performance metric of cluster 140 based on the aggregation of all the performance metrics 116. In other words, the performance metric of cluster 140 is an aggregation of the performance metrics of each virtual machine in the cluster.

In one embodiment, the performance metric of a cluster is CPU usage. More specifically, the CPU of a cluster equals the sum of CPU usage for each virtual machine in the cluster. For example, if each of the 4000 virtual machines in cluster 140 has a 1 Hz CPU usage (at the time the performance metric is accessed by CMA 110), then accumulator 112 determines that the CPU usage for cluster 140 is 4000 Hz (or 4 MHz).

Since the performance metric of a cluster is pre-calculated by CMA 110 and subsequently stored in database 150, it is not necessary to calculate the performance metric of the cluster by querying each of the performance metrics of each of the virtual machines of that cluster that are stored in the database. It is noted that performance metrics of individual virtual machines may be stored in database 150. However, such individual performance metrics of the virtual machines are not required to be accessed to calculate the performance metric of the cluster because the performance metric of the cluster has already been pre-calculated by CMA 110 and stored in database 150.

A calculated performance metric of a cluster, determined by CMA 110 is subsequently transmitted to database 150 for storage. For instance, a single performance metric of the cluster (e.g., 4 MHz) is transmitted to and stored in database 150. Moreover, the single performance metric of the cluster is stored with previously stored performance metrics of the cluster that were calculated/determined at previous intervals.

If VCE includes more than one cluster, for example, cluster 140 and cluster 141, then CMA 110 is able to access performance metrics of virtual machines from both clusters and determine a performance metric of each cluster (based on the respective virtual machines from each cluster). For example, a performance metric for cluster 140 is determined, as described herein.

Additionally, a performance metric of cluster 141 is also calculated in a similar manner as calculating a performance metric for cluster 140. For instance, host 122 of cluster 141 transmits performance metrics 118 of virtual machines 132 (hosted by host 122) to CMA 110. As such, accumulator 114 calculates a performance metric for cluster 141 in the same manner as accumulator 112 calculates a performance metric for cluster 140. The calculated performance metric (e.g., CPU usage) of cluster 141 is then transmitted to database 150 for storage. Additionally, the single performance metric of cluster 141 is stored with previously stored performance metrics of cluster 141 that were calculated/determined at previous intervals.

Performance metrics of other logical abstractions, such as datacenter and/or resource pools, may be determined by CMA 110. For instance, a performance metric may be determined for datacenters and/or resource pools of VCE 100. In general, a datacenter of VCE 100 is a collection of clusters. As such, CMA 110 receives performance metrics (e.g., CPU usage) of each virtual machine in a datacenter and a performance metric of the datacenter (e.g., CPU usage) is determined by CMA 110 in a similar fashion as determining a similar performance metric for a cluster, as described herein. The calculated performance metric of the datacenter is then transmitted to database 150 for storage. Additionally, the single performance metric of the datacenter is stored with previously stored performance metrics of the datacenter that were calculated/determined at previous intervals.

Likewise, CMA 110 may determine a performance metric for a resource pool. In general, resources pools include configurable pools of resources (e.g., CPU, memory, storage) of a host (or a cluster), and direct children of the host (or cluster). Control of the resource pools may be delegated to other individuals/organizations. With respect to resource pools, CMA 110 receives performance metrics (e.g., CPU usage) of each virtual machine in a resource pool and a performance metric of the resource pool (e.g., CPU usage) is determined by CMA 110 in a similar fashion as determining a similar performance metric for a cluster, as described herein. The calculated performance metric of the resource pool is then transmitted to database 150 for storage. Additionally, the single performance metric of the resource pool is stored with previously stored performance metrics of the resource pool that were calculated/determined at previous intervals.

It should be appreciated that the performance metric for the cluster can be any performance metric that may facilitate the management/performance of VCE 100. For example, the performance metric may be an average CPU usage. In such an example, with respect to cluster 140, CMA 110 receives the CPU usage of each virtual machine in host 120 and host 121. A first accumulator aggregates all of the CPU usage for each virtual machine and a second accumulator aggregates the number of virtual machines hosted by host 120 and host 121. Accordingly, the result of the first accumulator is divided by the result of the second accumulator to determine the average CPU usage.

CMA 110 calculates a performance metric (e.g., for a datacenter, cluster, resource pool, etc.) at periodic intervals. The periodic intervals may be any time duration, such as one minute, five minutes, one hour, etc. As a result, during each periodic time interval, in one example, CMA 110 receives performance metrics 116 of each virtual machine in hosts 120 and 121 and calculates a performance metric of cluster 140 based on the received performance metrics 116 for that particular time interval. At the end of a time interval, CMA 110 is reset and the next time interval begins.

During each time interval (e.g., five minutes), CMA 110, for example, receives the performance metrics from each virtual machine, as described herein. For example, during a time interval, CMA 110 receives performance metrics 116 which are the performance metrics of each of the virtual machines in cluster 140. Accumulator 112 accumulates or sums up each of the values of the performance metrics of the virtual machines as they are received. At the end of the interval, the aggregated value of the received performance metrics of the virtual machines is equal to the performance metric of the cluster during that time interval. The value of accumulator 112 (which is the performance metric of the cluster during that time interval) is then transmitted to database 150, as described herein.

It is noted that CMA 110 does not retain the received performance metrics during the entire interval. A received performance metric of a virtual machine is discarded by CMA 110 (during the time interval) once accumulator 112 accumulates the value of the performance metric. Accordingly, the lifetime of the performance metric of the virtual machine at CMA 110 is relatively short.

Ideally, during a time interval, performance metrics of each of the virtual machines of a cluster (or other logical abstraction) are accessed by CMA 110, by the end of the time interval, in order to calculate the performance metric for the cluster during the time interval. If one or more performance metrics of the virtual machines of the cluster are not received at CMA 110 by the end of the time interval, the performance metric of the cluster is still transmitted to database 150, as described herein. However, the performance metric of the cluster during the time interval is an approximation (and not completely accurate).

Late responses of performance metrics of virtual machines received by CMA 110 are not accumulated by accumulator 112 and discarded by CMA 110. For example, during interval X+1, CMA 110 receives performance metric of virtual machines from previous interval X. As such, during interval X+1, CMA 110 does not accumulate and discards any performance metrics of the virtual machines for interval X (or any other previous interval). CMA 110 may receive delayed performance metrics due to network latency.

After the performance metric of the cluster is calculated and subsequently transmitted to database 150, by CMA 110, the accumulator utilized to calculate the performance metric of a cluster is reset to zero. In doing so, CMA 110 is reset for receiving a new set of performance metrics and calculating a new performance metric during the next periodic time interval.

The performance metric of a cluster calculated at CMA 110 and subsequently stored in database 150 is pre-aggregated or pre-calculated. That is, the performance metric of the cluster is calculated at CMA 110 prior to being stored in database 150. As a result, only a single value for the performance metric of the cluster is stored in database 150.

In contrast, in conventional methods, performance metrics of individual virtual machines metrics stored in the database are queried and subsequently used to calculate a performance metric of a cluster. As a result, there is a delay in determining the performance metric of cluster because the database does not provide a timely response in accessing the large number of stored performance metrics for each of the virtual machines for the cluster.

It should be appreciated that performance metrics of a cluster stored in database 150 are actual snap shots of the performance metrics of the cluster at that time. As a result, the performance metrics of the cluster stored in database 150 are immutable for past periods with respect to future changes in the cluster (e.g., add host, remove host).

Embodiments of Displaying Historical Performance Metrics

Figure 3:
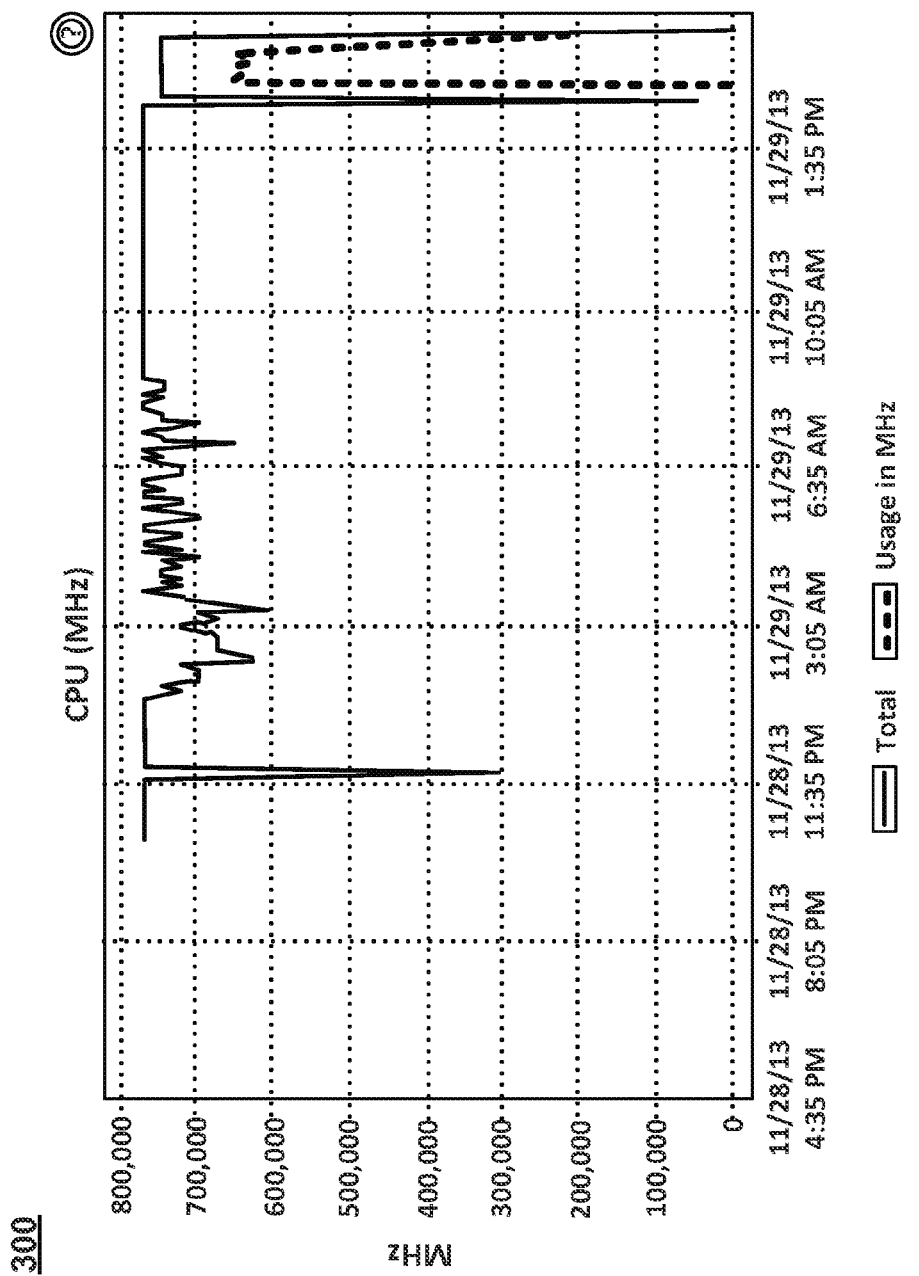
FIG. 3 depicts a graph of performance metrics, according to various embodiments.

FIG. 3 depicts an embodiment of a graph 300 of historical performance metrics. For example, graph 300 depicts historical CPU usage of a cluster. In particular, graph 300 depicts the historical CPU usage of a cluster during a one day period.

In one embodiment, graph 300 is a graph of at least a portion of historical performance metrics 160 stored in database 150. For example, a user may desire to view the CPU usage of cluster 140 during a previous one day period. Accordingly, the user provides commands to CMA 110 to retrieve historical performance metrics 160 of cluster 140 for the desired one day period. The retrieved data from database 150 is then formatted into graph 300.

In one embodiment, a user requests to view a graph of historical performance metrics 160 via an application programming interface (API) of CMA 110.

It should be appreciated that graph 300 can depict historical performance metrics during any time frame that is associated with historical performance metrics 160. For example, yearly charts are comprised of one day intervals, monthly charts have two hour intervals, weekly charts have thirty minute intervals, one day charts have five minute intervals, etc. Typically, the longer the desired time period (e.g., yearly), the coarser the time interval.

It should be appreciated that when a request to generate graph 300 is provided, historical performance metrics 160 are accessed and immediately displayed in graph 300 because the historical performance metrics are a pre-aggregation of the performance metrics of each virtual machine in the cluster. As such, the calculation of the performance metrics of a cluster are already determined and stored in database 150. Therefore, the time to access and display the historical performance metrics 160 is very short (e.g., 3 seconds) in response to a user providing commands to view the historical performance metrics 160 in a graph.

It should be appreciated that graph 300 may also be depicted concurrently with other graphs depicting performance metrics. For example, other graphs may depict memory usage, storage usage and the like.

Example Methods of Operation

The following discussion sets forth in detail the operation of some example methods of operation of embodiments. With reference to FIGS. 4 and 5, flow diagrams 400 and 500 illustrate example procedures used by various embodiments. Flow diagrams 400 and 500 include some procedures that, in various embodiments, may include some steps that are carried out by a processor under the control of computer-readable and computer-executable instructions. In this fashion, procedures described herein and in conjunction with flow diagrams 400 and 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments. The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 400 and 500 such procedures are examples. That is, embodiments are well suited to performing various other procedures or variations of the procedures recited in flow diagrams 400 and 500. Likewise, in some embodiments, the procedures in flow diagrams 400 and 500 may be performed in an order different than presented and/or not all of the procedures described in one or more of these flow diagrams may be performed.

FIG. 4 depicts a process flow diagram 400 of a method for calculating a performance metric of a cluster of hosts in a virtualization infrastructure, according to various embodiments.

At 410, a performance metric of each of a plurality of virtual machines in the virtualization infrastructure is accessed by a centralized management application of a virtualization infrastructure. The virtualization infrastructure comprises a plurality of hosts supporting the plurality of virtual machines. For example, VCE 100 or virtualization infrastructure includes a plurality of hosts (e.g., 120, 121 and 122) providing the underlying hardware for the virtualization infrastructure. CMA 110 (e.g., vCenter) receives performance metrics 116 which are a performance metric from each of the virtual machines 130 and 131, that are supported by host 120 and host 121, respectively, that are in cluster 140.

At 412, in one embodiment, periodically access during a time interval a performance metric of each of a plurality of virtual machines. For example, performance metrics 116 are periodically accessed during a time interval, such as five minutes. That is, during a first five minute time interval, performance metrics 116 are received by CMA 110 for that time interval. Then during a subsequent five minute time interval, a second set of performance metrics are received by CMA 110 for that time interval.

At 420, calculate, by the centralized management application, a performance metric of a cluster of the plurality of hosts, based on the performance metric of each of the plurality of virtual machines hosted by the cluster. For example, accumulator 112 accumulates all of performance metrics 116 (of the virtual machines of cluster 140) to calculate a performance metric of cluster 140. The value of the performance metric of the cluster, in one embodiment, is a single integer (e.g., 4000 MHz of CPU usage)

At 430, transmit the calculated performance metric of the cluster to a database, such that a history of performance metrics of the cluster are stored in the database. For example, at the end of a time interval, CMA 110 transmits the calculated performance metric of cluster 140 (e.g., 4000 MHz of CPU usage) to database 150 wherein the calculated performance metric of cluster 140 is stored with previously calculated performance metrics. The aggregation of performance metrics is historical performance metrics 160.

At 440, discard a performance metric of one the plurality of virtual machines if the performance metric is received during a subsequent time interval. For example, during a time interval X+1, CMA 110 discards a performance metric of a virtual machine for a previous time interval X.

At 450, reset an accumulator for calculating the performance metric of the cluster at an end of a periodic time interval. For example, at the end of a periodic time interval, the performance metric of cluster 140 is transmitted to database 150. Additionally, the accumulator 112 is reset such that the accumulator is ready to aggregate performance metrics obtained during the next time interval.

At 460, query the database for the history the performance metrics of the cluster such that the database is not queried for the performance metric of each of a plurality of virtual machines hosted by the cluster. For example, a user requests, via CMA 110, to view a historical chart of a performance metric (e.g., CPU usage) of cluster 140. In response to the request, historical performance metrics 160 of cluster 140 are accessed from database 150 and available for immediate display as graph 300.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 of a method for calculating a performance metric of a cluster of hosts in a virtualization infrastructure according to various embodiments.

At 510, access, by a centralized management application of a virtualization infrastructure, a central processing unit (CPU) performance metric of each of a plurality of virtual machines in the virtualization infrastructure, wherein the virtualization infrastructure comprises a plurality of hosts supporting the plurality of virtual machines. For example, VCE 100 or virtualization infrastructure includes a plurality of hosts (e.g., 120, 121 and 122) providing the underlying hardware for the virtualization infrastructure. CMA 110 (e.g., vCenter) receives performance metrics 116 (e.g., CPU usage) which are a performance metric from each of the virtual machines 130 and 131, that are supported by host 120 and host 121, respectively, that are in cluster 140.

At 512, in one embodiment, periodically access during a time interval a CPU performance metric of each of a plurality of virtual machines. For example, performance metrics 116 (e.g., CPU usage) are periodically accessed during a time interval, such as five minutes. That is, during a first five minute time interval, performance metrics 116 are received by CMA 110. After the first time interval, the performance metrics are discarded. Then during a second five minute time interval, a second set of performance metrics are received by CMA 110.

At 520, calculate, by the centralized management application, a CPU performance metric of a cluster of the plurality of hosts by aggregating the CPU performance metric of each of the plurality of virtual machines hosted by the cluster. For example, accumulator 112 accumulates all of performance metrics 116 (of the virtual machines of cluster 140) to calculate a performance metric of cluster 140 (e.g., CPU usage of cluster 140). The value of the performance metric of the cluster, in one embodiment, is a single integer (e.g., 4000 MHz of CPU usage)

At 530, transmit the calculated CPU performance metric of the cluster to a database, by the centralized management application, such that a history of CPU performance metrics of the cluster are stored in the database. For example, at the end of a time interval, CMA 110 transmits the calculated performance metric of cluster 140 (e.g., 4000 MHz of CPU usage) to database 150 wherein the calculated performance metric of cluster 140 is stored with previously calculated performance metrics. The aggregation of performance metrics is historical performance metrics 160.

At 540, discard a performance metric of one the plurality of virtual machines if the performance metric is received during a subsequent time interval. For example, during a time interval X+1, CMA 110 discards a performance metric of a virtual machine for a previous time interval X.

At 550, query the database for the history the CPU performance metrics of the cluster such that the database is not queried for the CPU performance metric of each of a plurality of virtual machines hosted by the cluster. For example, a user requests, via CMA 110, to view a historical chart of a performance metric (e.g., CPU usage) of cluster 140. In response to the request, historical performance metrics 160 of cluster 140 are accessed from database 150 and available for immediate display as graph 300.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A computer-implemented method for calculating a performance metric of a cluster of hosts in a virtualization infrastructure comprising a datacenter, said computer-implemented method comprising:

accessing, by a centralized management application of a virtualization infrastructure comprising said datacenter, a performance metric of each of a plurality of virtual machines in said virtualization infrastructure comprising said datacenter, said performance metric of each of said plurality of virtual machines hosted by said cluster stored in a first database, wherein said virtualization infrastructure comprising said datacenter comprises a plurality of hosts supporting said plurality of virtual machines;

calculating, by said centralized management application, a performance metric of a cluster of said plurality of hosts, based on said performance metric of each of said plurality of virtual machines hosted by said cluster;

discarding a performance metric of one said plurality of virtual machines if said performance metric is received after said calculating, by said centralized management application, of said performance metric of said cluster of said plurality of hosts;

after said centralized management application calculates said performance metric of said cluster of said plurality of hosts, discarding said performance metric of each of said plurality of virtual machines hosted by said cluster from said first database; and transmitting said calculated performance metric of said cluster to a second database, such that a history of performance metrics of said cluster are stored in said second database, and such that said performance metric of each of said plurality of virtual machines hosted by said cluster is not stored in said first database.

2. The computer-implemented method of claim 1, wherein said performance metric is a central processing unit (CPU) performance metric.

3. The computer-implemented method of claim 1, wherein said accessing further comprises:

periodically accessing, during a time interval, a performance metric of each of a plurality of virtual machines.

4. The computer-implemented method of claim 1, wherein said calculating is performed in response to said accessing a performance metric of each of a plurality of virtual machines from each of said plurality of hosts.

5. The computer-implemented method of claim 1, wherein said calculating is performed by an accumulator of said centralized management application.

6. The computer-implemented method of claim 1, wherein said calculating is performed by a plurality of accumulators of said centralized management application.

7. The computer-implemented method of claim 1, wherein said performance metric of a cluster of said plurality of hosts is an aggregation of said performance metric of each of said plurality of virtual machines hosted by said cluster.

8. The computer-implemented method of claim 1, further comprising:

resetting an accumulator for calculating said performance metric of said cluster at an end of a periodic time interval.

9. The computer-implemented method of claim 1, wherein said transmitting said calculated performance metric of said cluster is performed at an end of a periodic time interval.

10. The computer-implemented method of claim 1, further comprising:

querying said second database for said history of said performance metrics of said cluster such that said second database is not queried for said performance metric of each of a plurality of virtual machines hosted by said cluster.

11. A non-transitory computer-readable storage medium having instructions embodied therein that when executed cause a computer system to perform a method for calculating a performance metric of a cluster of hosts in a virtualization infrastructure comprising a datacenter, said method comprising:

accessing, by a centralized management application of a virtualization infrastructure comprising said datacenter, a central processing unit (CPU) performance metric of each of a plurality of virtual machines in said virtualization infrastructure comprising said datacenter, said CPU performance metric of each of said plurality of virtual machines hosted by said cluster stored in a first database, wherein said virtualization infrastructure comprising said datacenter comprises a plurality of hosts supporting said plurality of virtual machines;

calculating, by said centralized management application, a CPU performance metric of a cluster of said plurality of hosts by aggregating said CPU performance metric of each of said plurality of virtual machines hosted by said cluster;

discarding a CPU performance metric of one said plurality of virtual machines if said CPU performance metric is received after said calculating, by said centralized management application, of said CPU performance metric of said cluster of said plurality of hosts;

after said centralized management application calculates said CPU performance metric of said cluster of said plurality of hosts, discarding said CPU performance metric of each of said plurality of virtual machines hosted by said cluster from said first database; and transmitting said calculated CPU performance metric of said cluster to a second database, by said centralized management application, such that a history of CPU performance metrics of said cluster are stored in said second database, and such that said CPU performance metric of each of said plurality of virtual machines hosted by said cluster is not stored in said second database.

12. The non-transitory computer-readable storage medium of claim 11, wherein said accessing further comprises:

periodically accessing, during a time interval, a CPU performance metric of each of a plurality of virtual machines.

13. The non-transitory computer-readable storage medium of claim 11, wherein said calculating is performed in response to said accessing a CPU performance metric of each of a plurality of virtual machines from each of said plurality of hosts.

14. The non-transitory computer-readable storage medium of claim 11, wherein said calculating is performed by an accumulator of said centralized management application.

15. The non-transitory computer-readable storage medium of claim 11, wherein said calculating is performed by a plurality of accumulators of said centralized management application.

16. The non-transitory computer-readable storage medium of claim 11, wherein said transmitting said calculated CPU performance metric of said cluster is performed at an end of a periodic time interval.

17. The non-transitory computer-readable storage medium of claim 11, further comprising:

querying said second database for said history of said CPU performance metrics of said cluster for immediate display of said history of said CPU performance metrics of said cluster.

18. The non-transitory computer-readable storage medium of claim 11, further comprising:

querying said second database for said history of said CPU performance metrics of said cluster such that said second database is not queried for said CPU performance metric of each of a plurality of virtual machines hosted by said cluster.

* * * * *